United States Patent
Zöls

(10) Patent No.: US 7,633,022 B2
(45) Date of Patent: Dec. 15, 2009

(54) CIRCUIT BREAKER SYSTEM

(75) Inventor: Fred Zöls, Schwarzenbruck (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 211 days.

(21) Appl. No.: 11/935,652

(22) Filed: Nov. 6, 2007

(65) Prior Publication Data

US 2008/0291592 A1 Nov. 27, 2008

Related U.S. Application Data

(63) Continuation of application No. PCT/EP2006/004148, filed on May 4, 2006.

(30) Foreign Application Priority Data

May 6, 2005 (DE) .................. 20 2005 007 220 U

(51) Int. Cl.
*H01R 13/70* (2006.01)
(52) U.S. Cl. ...................... 200/51 R; 307/42
(58) Field of Classification Search ............... 200/51 R, 200/51.09, 51.1, 51.11, 51.12; 307/42; 361/62, 361/63, 93.2, 93.3, 93.9, 64–66, 18, 2, 19, 361/56, 57, 58, 601, 602, 622–628
See application file for complete search history.

(56) References Cited

U.S. PATENT DOCUMENTS

| | | | | |
|---|---|---|---|---|
| 4,882,554 A | * | 11/1989 | Akaba et al. | ................ 333/105 |
| 5,517,091 A | * | 5/1996 | Becher et al. | ................ 318/49 |
| 5,581,134 A | * | 12/1996 | Romerein et al. | ....... 307/132 M |
| 5,659,209 A | * | 8/1997 | Huen | ........................ 307/125 |
| 6,490,141 B2 | | 12/2002 | Fischer et al. | |
| 7,020,213 B2 | * | 3/2006 | Kunikata | ..................... 375/260 |
| 7,224,557 B2 | * | 5/2007 | Kinsella et al. | ................ 361/2 |

FOREIGN PATENT DOCUMENTS

WO 00/74196 A1 12/2000

* cited by examiner

*Primary Examiner*—Michael A Friedhofer
(74) *Attorney, Agent, or Firm*—Laurence A. Greenberg; Werner H. Stemer; Ralph E. Locher

(57) ABSTRACT

A circuit breaker system has a switch, in particular in the form of a controllable power semiconductor, which is connected between a voltage input and a load output for the purpose of switching a load within a current path. The circuit breaker system further includes a circuit breaker, which can be repositioned between a first plug-in position forming a series circuit with the switch and a second plug-in position forming a parallel circuit with the switch.

12 Claims, 1 Drawing Sheet

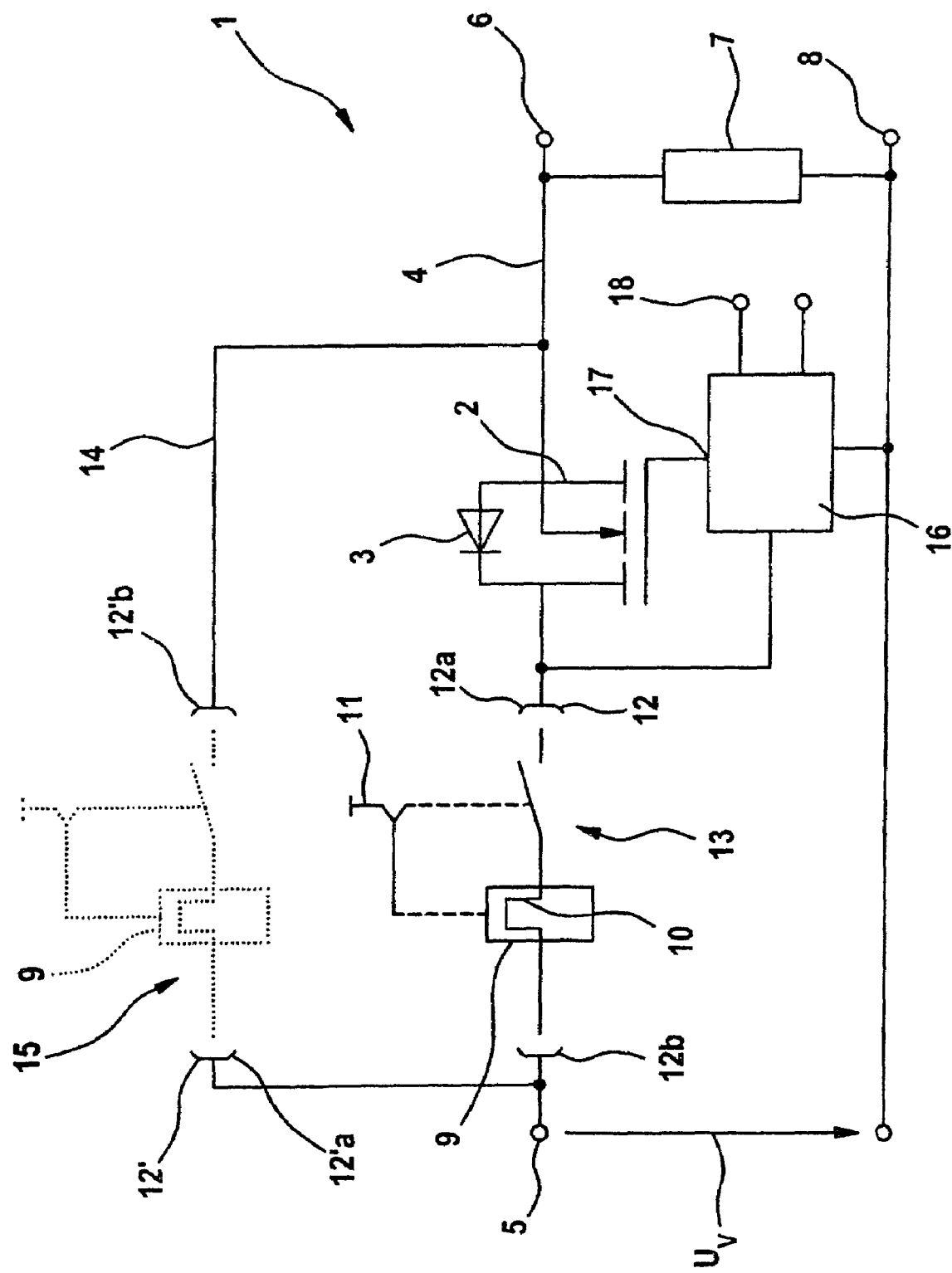

_US 7,633,022 B2_

CIRCUIT BREAKER SYSTEM

CROSS-REFERENCE TO RELATED APPLICATIONS

This is a continuing application, under 35 U.S.C. § 120, of copending international application No. PCT/EP2006/004148, filed May 4, 2006, which designated the United States; this application also claims the priority, under 35 U.S.C. § 119, of German patent application DE 20 2005 007 220.6, filed May 6, 2005; the prior applications are herewith incorporated by reference in their entirety.

BACKGROUND OF THE INVENTION

Field of the Invention

The invention relates to a circuit breaker system with a switch, in particular a controllable power semiconductor, for the purpose of switching a load.

In on-board power systems, for example of motor vehicles or aircraft, electrical components for the switching on or off of consumer loads are increasingly stepping into the foreground. To this end, controllable switches in the form of power semiconductors for the switching of one or several loads or, respectively, consumer loads are used in particular. However, such electronic switches are not absolutely failsafe. In principle, two potential error statuses may occur, namely a break in which the main path (source and drain) is insulated, or a failure in which the main path is short-circuited. Consequently, depending on the error status that occurred, a connected load is therefore always switched off or always switched on.

BRIEF SUMMARY OF THE INVENTION

It is accordingly an object of the invention to provide a circuit breaker system that overcomes the above-mentioned disadvantages of the prior art devices of this general type, that makes it possible to switch a load even during a critical application, in particular in the case of a defective electronic switch.

With the foregoing and other objects in view there is provided, in accordance with the invention, a circuit breaker system. The circuit breaker system contains a voltage input, a load output, and a switch being switched between the voltage input and the load output for switching a load within a current path. A first plug-in position forms a series circuit together with the switch and a second plug-in position forms a parallel circuit connected in parallel with the switch. A circuit breaker is provided that can be repositioned between the first plug-in position forming the series circuit together with the switch and the second plug-in position forming the parallel circuit connected in parallel with the switch.

To this end, a circuit breaker system is provided with a preferably controllable switch, in particular in the form of a power semiconductor, that is switched between a voltage input and a charge output for the purpose of switching a load. An additional circuit breaker can be repositioned between a first plug-in position and a second plug-in position. In this context, the circuit breaker is switched in a series with the controllable switch in the first plug-in position while in the second plug-in position, the circuit breaker is switched parallel to the preferably electronic switch.

In the first plug-in position, in which the circuit breaker forms a series connection together with the switch, the circuit breaker advantageously serves as an overload protector for the switch and/or the load. Thus, an overload protector is available even in the event that the switch fails during a failure in the event of an error and thus is short-circuited.

The first plug-in position of the circuit breaker within the current path, hereinafter also referred to as main current path, may be provided on the feed-in or on the load side of the switch. In the first-mentioned case, a plug-in cap preferably forming the first plug-in position is connected upstream of the switch. In the second case, the plug-in cap forming the first plug-in position is switched downstream of the switch.

In the second plug-in position, the circuit breaker provides the power supply of the load or of a consumer load in the event that the switch no longer provides or ensures a power supply via the main current path due to a break. A plug-in cap forming the second plug-in position is advantageously switched parallel to the switch between the voltage input and the voltage output. To this end, the second plug-in cap forms a bypass current path to the main current path in the event that the circuit breaker is plugged into this plug-in cap forming the second plug-in position.

In this context, the plug-in caps are advantageously configured as a flat socket in the manner of a flat fuse socket common in onboard electrical systems. Accordingly, the circuit breaker is configured in flat cable plug fashion, having two flat cable plugs that are bypassed and connected in electrically conductive fashion within a switch casing via a thermal activation element, in particular a snap disk bimetal. In this configuration, the bimetal is fixed at one of the two flat cable plugs and in contacting overlapping position with the other flat cable plug. In the event of an overcurrent or a short circuit, a thermal activation occurs above a pre-settable current threshold by the circuit breaker then acting as overcurrent circuit breaker when through a bending up of the bimetal the overlapping position with the corresponding flat-cable plug is opened and thereby disconnected.

Such an overcurrent circuit breaker has been known from published, non-prosecuted German patent application DE 198 56 707 A1 (corresponding to U.S. Pat. No. 6,590,489) and from published, European patent application EP 1 151 692 A2 (corresponding to U.S. Pat. No. 6,394,100). The overcurrent circuit breakers known from there involve manually activated or push-button activated overcurrent circuit breakers in which in the event of a triggering a spring-loaded insulation slide moves into the overlapping area between the bimetal and the corresponding flat cable plug which can be moved back into its starting position via the push button. A push button and/or slide-less overcurrent circuit breaker may be used as a circuit breaker in lieu of this push-button activated overcurrent circuit breaker.

The switch is advantageously a switching semiconductor, in particular an MOS field effect transistor (MOSFET). The switch may also be a so-called insulated gate bipolar transistor (IGBT) or a Darlington transistor. This switching semiconductor is advantageously activated within the circuit breaker system by a control mechanism. To this end, the control mechanism is equipped with a control output that is guided to the gate of the switch configured as a semiconductor.

In an advantageous embodiment, the control mechanism is provided with a BUS interface. Also, the power switch forming the switch can be controlled directly via a BUS interface of a BUS system, such as, for example, the CAN-BUS (controller area network).

The circuit breaker system is therefore suitable for a power distribution system with a number of electric circuits. Such a power distribution system that is preferably usable in a DC low voltage net has been known per se from European patent EP 1 186 086 B1 (corresponding to U.S. Pat. No. 6,490,141). Now, if in such a power distribution system such a circuit breaker system in accordance with the invention is allocated to each electric circuit, an additional fuse is provided as an emergency circuit by the repluggable circuit breaker for the exit step to which the respective load is connected and which is circuited by the switch.

Other features which are considered as characteristic for the invention are set forth in the appended claims.

Although the invention is illustrated and described herein as embodied in a circuit breaker system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a schematic block diagram of a circuit breaker system with a controllable power switch and with a repluggable circuit breaker according to the invention.

DETAILED DESCRIPTION OF THE INVENTION

Referring now to the single FIGURE of the drawing in detail, there is shown a circuit breaker system 1 that contains a controllable switch in the form of a power semiconductor 2. The latter is here an MOS field effect transistor that is wired by a free-wheeling diode.

The power switch 2 is circuited within a current path 4 between a voltage input (LINE) 5 and a load exit (LOAD) 6. An input voltage $U_V$ of the circuit breaker system lies within the low-voltage range and amounts to, for example, 24 V DC or 48 V DC. On the output side, a load or a power consumer 7 is circuited to the load output against mass (GROUND) 8.

Within the current path 4 in the example of an embodiment at hand, a circuit breaker 9 is circuited upstream to the power switch 2 on the drain side. The circuit breaker 9 is a thermal overcurrent circuit breaker executed as a flat connection known, for example, from published, non-prosecuted German patent application DE 198 56 707 A1 or published, European patent application EP 0 151 692 A2. A bimetal 10 is indicated as a thermal activation element of the circuit breaker 9. Moreover, a manual activation of the circuit breaker 9 by a push button or manual activation element 11 is indicated as well.

The circuit breaker 9 is plugged into a plug-in socket 12 whose first socket connection 12a is connected to the power switch 2 on the drain side. The second socket connection 12b on the opposite side is connected to the voltage input 5 of the circuit breaker system. The plug-in socket 12 forms a first plug-in position 13 in which the circuit breaker 9 forms a series connection together with the power switch 2. In this plug-in position 13, the circuit breaker 9 protects the load 7 from an overload, in particular in the case of a defective or short-circuited power switch 2.

In the case of a defectively operating power switch 2, the latter is likewise protected from an overload by the circuit breaker 9. This function of the overload protection is ensured even when the first plug-in position 13 is realized between the power semiconductor and the load output 6 within the main current path 4. In this case, the circuit breaker 9 is circuited downstream of the power switch 2 on the source side.

Between the voltage input 5 and the load output 6 a bypass current path 14 is provided within which a second plug-in position 15 of the circuit breaker 9 is realized. The second plug-in position 15 is in turn formed by a flat connection plug-in socket 12' corresponding to the first plug-in position. Its one socket connection 12'b in turn is connected to the voltage input 5 while the opposite socket connection 12'a is directly connected to the load output 6. The bypass current path 14 thus lies parallel to the series connection formed by the power switch 2 and the plug-in socket 12 forming the first plug-in position 13.

The bypass current path 14 of the circuit breaker system 1 serves as an emergency function for the power or voltage supply of the load 7 in the event that the main current path 4 is interrupted due to a defective power semiconductor 2. Such an error case is present when the drain-source-line of the power semiconductor 2 is interrupted or insulated. In this case, the load 7 supplied via the main current path 4 would be virtually shut off.

In order to connect the load or the power consumer 7 to the supply voltage $U_V$ in spite of that, thereby making the power supply of the load 7 possible, the circuit breaker 9 is repositioned from the first plug-in position 13 to the second plug-in position 15. In that case, the power supply occurs via the bypass current path 14. In this context, an overload protection of the consumer 7 is ensured to a large extent since the circuit breaker 9 is executed as a thermal overcurrent circuit breaker.

The control of the power switch 2 occurs via a control mechanism 16 whose control output 17 is connected for this purpose to the control input (gate) of the power semiconductor 2. In addition, the control mechanism 16 is provided with a BUS interface 18 for a coupling of the circuit breaker system 1 to a BUS system.

A communication of the circuit breaker system 1 with a superordinated control or diagnosis system may occur via such BUS interface, with the power switch 2 receiving corresponding control signals for the switching of the load 7 via such a BUS system, for example directly by a CAN BUS communication, or via the control mechanism, and/or transmitting diagnosis data, in particular in the event of an error, to the superordinated control and diagnosis mechanism. Thus, a data exchange between the circuit breaker system 1 and the superordinated control and/or diagnosis mechanism may occur via this BUS interface 18 for the control, protection and monitoring of the load 7 as well as for an error and/or status report.

The invention claimed is:

1. A circuit breaker system, comprising:
   a voltage input;
   a load output;
   a switch being switched between said voltage input and said load output for switching a load within a current path;
   a first plug-in position forming a series circuit together with said switch;
   a second plug-in position forming a parallel circuit connected in parallel with said switch; and
   a circuit breaker that can be repositioned between said first plug-in position forming said series circuit together with said switch and said second plug-in position forming said parallel circuit connected in parallel with said switch.

2. The circuit breaker system according to claim 1, further comprising a plug-in socket, forming said first plug-in position, connected upstream of said switch.

3. The circuit breaker system according to claim 2, further comprising a further plug-in socket, forming said second plug-in position, connected in parallel to said switch between said voltage input and said load output.

4. The circuit breaker system according to claim 1, wherein said switch is a field effect transistor.

5. The circuit breaker system according to claim 1, wherein said circuit breaker is a thermal overcurrent circuit breaker.

6. The circuit breaker system according to claim 1, further comprising a control mechanism connected to and controlling said switch.

7. The circuit breaker system according to claim 1, further comprising a bus interface for controlling said switch via a BUS interface.

8. The circuit breaker system according to claim 1, wherein said circuit breaker in said first plug-in position serves as overload protection.

9. The circuit breaker system according to claim 1, wherein said circuit breaker in said second plug-in position forms a bypass current path for switching the load on and off.

10. The circuit breaker system according to claim 1, wherein said switch is a controllable power semiconductor.

11. The circuit breaker system according to claim 1, wherein said switch is a MOS field effect transistor.

12. A power distribution system, comprising:
electric circuits each having a circuit breaker system, said circuit breaker system including:
a voltage input;
a load output;
a switch being switched between said voltage input and said load output for switching a load within a current path;
a first plug-in position forming a series circuit together with said switch;
a second plug-in position forming a parallel circuit connected in parallel with said switch; and
a circuit breaker that can be repositioned between said first plug-in position forming said series circuit together with said switch and said second plug-in position forming said parallel circuit connected in parallel with said switch.

* * * * *